(12) United States Patent
Higgins et al.

(10) Patent No.: US 9,061,371 B2
(45) Date of Patent: Jun. 23, 2015

(54) DISPOSABLE MANDREL FOR FRICTION STIR JOINING

(71) Applicant: MEGASTIR TECHNOLOGIES LLC, Provo, UT (US)

(72) Inventors: Paul T. Higgins, Houston, TX (US); Barry Wayne Struthers, Houston, TX (US); Rod W. Shampine, Houston, TX (US); Jeremy Peterson, Cedar Hills, UT (US); Rodney Dale Fleck, Mansfield, TX (US); Russell J. Steel, Salem, UT (US); Scott M. Packer, Alpine, UT (US)

(73) Assignee: MEGASTIR TECHNOLOGIES LLC, Provo, UT (US)

( * ) Notice: Subject to any disclaimer, the term of this patent is extended or adjusted under 35 U.S.C. 154(b) by 0 days.

(21) Appl. No.: 13/894,238

(22) Filed: May 14, 2013

(65) Prior Publication Data

US 2013/0299560 A1 Nov. 14, 2013

Related U.S. Application Data

(60) Provisional application No. 61/646,872, filed on May 14, 2012.

(51) Int. Cl.
*B23K 37/00* (2006.01)
*B23K 20/12* (2006.01)
*B23K 20/26* (2006.01)

(52) U.S. Cl.
CPC .............. *B23K 20/129* (2013.01); *B23K 20/26* (2013.01); *B23K 20/126* (2013.01); *B23K 2201/06* (2013.01)

(58) Field of Classification Search
None
See application file for complete search history.

(56) References Cited

U.S. PATENT DOCUMENTS

| | | | | |
|---|---|---|---|---|
| 2,433,172 A | * | 12/1947 | Tipton | 269/200 |
| 2,780,184 A | * | 2/1957 | Olsson | 52/15 |
| 2,870,794 A | * | 1/1959 | Thaxton | 138/90 |
| 3,381,755 A | * | 5/1968 | Morrison | 166/191 |
| 4,310,138 A | * | 1/1982 | Johnston | 249/180 |
| 4,608,739 A | | 9/1986 | Miller | |
| 5,071,053 A | | 12/1991 | Heijnen | |
| 5,182,849 A | * | 2/1993 | Marco | 29/600 |
| 5,259,901 A | * | 11/1993 | Davis et al. | 156/154 |
| 5,428,896 A | * | 7/1995 | Auberon et al. | 29/888.09 |
| 5,451,741 A | * | 9/1995 | Doronin et al. | 219/160 |
| 5,536,050 A | | 7/1996 | McDermott et al. | |
| 6,068,178 A | | 5/2000 | Michisaka | |
| 6,247,634 B1 | | 6/2001 | Whitehouse | |

(Continued)

FOREIGN PATENT DOCUMENTS

| | | | | |
|---|---|---|---|---|
| JP | 61-078521 A | * | 4/1986 | |
| JP | 63-139733 A | * | 6/1988 | |
| JP | 2001-260221 A | * | 9/2001 | |

OTHER PUBLICATIONS

U.S. Appl. No. 13/894,250, Aug. 6, 2014, Office Action.

(Continued)

*Primary Examiner* — Kiley Stoner
(74) *Attorney, Agent, or Firm* — Workman Nydegger

(57) ABSTRACT

A system and method for providing a mandrel that can be used to react the loads that are created by a friction stir joining tool as it performs friction stir joining of tubulars, the mandrel selected from a disposable mandrel, a partially disposable mandrel, a reusable mandrel, and a mandrel that is partially disposable and partially reusable.

8 Claims, 16 Drawing Sheets

(56) References Cited

U.S. PATENT DOCUMENTS

| | | |
|---|---|---|
| 6,450,395 B1 | 9/2002 | Weeks et al. |
| 7,115,324 B1 * | 10/2006 | Stol et al. ............ 428/594 |
| 7,874,471 B2 | 1/2011 | Fairchild |
| 2002/0060236 A1 * | 5/2002 | Jankus ............ 228/44.5 |
| 2003/0047650 A1 * | 3/2003 | Schnorrer ............ 248/62 |
| 2005/0035173 A1 | 2/2005 | Steel et al. |
| 2006/0065698 A1 | 3/2006 | Ishikawa et al. |
| 2006/0260376 A1 * | 11/2006 | Osame ............ 72/269 |
| 2007/0215675 A1 | 9/2007 | Barnes |
| 2009/0026659 A1 * | 1/2009 | Vontell et al. ............ 264/328.7 |
| 2009/0134203 A1 | 5/2009 | Domec et al. |
| 2009/0282832 A1 * | 11/2009 | Haynes ............ 60/752 |
| 2010/0219230 A1 | 9/2010 | Packer et al. |
| 2010/0237531 A1 * | 9/2010 | Lyons et al. ............ 264/132 |
| 2010/0243714 A1 | 9/2010 | Allehuax et al. |
| 2010/0326962 A1 | 12/2010 | Calla et al. |
| 2011/0127311 A1 | 6/2011 | Peterson et al. |
| 2011/0253525 A1 * | 10/2011 | Johnson et al. ............ 204/192.15 |
| 2012/0305393 A1 * | 12/2012 | Ivanov et al. ............ 204/298.13 |
| 2014/0151438 A1 | 6/2014 | Fleck et al. |

OTHER PUBLICATIONS

U.S. Appl. No. 13/894,250, Jan. 7, 2015, Office Action.

* cited by examiner

DISPOSABLE MANDREL FOR FRICTION STIR JOINING

BACKGROUND

Description of Related Art

Friction stir joining is a technology that has been developed for welding metals and metal alloys. Friction stir welding is generally a solid state process that has been researched, developed and commercialized over the past 20 years. Solid state processing is defined herein as a temporary transformation into a plasticized state that may not include a liquid phase. However, it is noted that some embodiments allow one or more elements to pass through a liquid phase.

Friction stir joining began with the joining of aluminum materials because friction stir joining tools could be made from tool steel and adequately handle the loads and temperatures that are needed to join aluminum. Friction stir joining has continued to progress into higher melting temperature materials such as steels, nickel base alloys and other specialty materials because of the development of superabrasive tool materials and tool designs capable of withstanding the forces and temperatures needed to flow these higher melting temperature materials.

It is understood that the friction stir joining process often involves engaging the material of two adjoining planar workpieces on either side of a joint by a rotating stir pin. Force is exerted to urge the pin and the workpieces together and frictional heating caused by the interaction between the pin, shoulder and the workpieces results in plasticization of the material on either side of the joint. The pin and shoulder combination or "FSW tip" is traversed along the joint, plasticizing material as it advances, and the plasticized material left in the wake of the advancing FSW tip cools to form a weld. The FSW tip may also be a tool without a pin so that the shoulder is processing another material through FSP.

FIG. 1 is a perspective view of a tool being used for friction stir joining that is characterized by a generally cylindrical tool 10 having a shank, a shoulder 12 and a pin 14 extending outward from the shoulder. The pin 14 is rotated against a workpiece 16 until sufficient heat is generated, at which point the pin of the tool is plunged into the plasticized planar workpiece material. In this example, the pin 14 is plunged into the planar workpiece 16 until reaching the shoulder 12 which prevents further penetration into the workpiece. The planar workpiece 16 is often two sheets or plates of material that are butted together at a joint line 18. In this example, the pin 14 is plunged into the planar workpiece 16 at the joint line 18.

Referring to FIG. 1, the frictional heat caused by rotational motion of the pin 14 against the planar workpiece material 16 causes the workpiece material to soften without reaching a melting point. The tool 10 is moved transversely along the joint line 18, thereby creating a weld as the plasticized material flows around the pin from a leading edge to a trailing edge along a tool path 20. The result is a solid phase bond at the joint line 18 along the tool path 20 that may be generally indistinguishable from the workpiece material 16, in contrast to the welds produced when using conventional non-FSW welding technologies.

It is observed that when the shoulder 12 contacts the surface of the planar workpieces, its rotation creates additional frictional heat that plasticizes a larger cylindrical column of material around the inserted pin 14. The shoulder 12 provides a forging force that contains the upward metal flow caused by the tool pin 14.

During friction stir joining, the area to be joined and the tool are moved relative to each other such that the tool traverses a desired length of the weld joint at a tool/workpiece interface. The rotating friction stir welding tool 10 provides a continual hot working action, plasticizing metal within a narrow zone as it moves transversely along the base metal, while transporting metal from the leading edge of the pin 14 to its trailing edge. As the weld zone cools, there is no solidification as no liquid is created as the tool 10 passes. It is often the case, but not always, that the resulting weld is a defect-free, recrystallized, fine grain microstructure formed in the area of the weld.

In the present state of the art, arcuate or curved surfaces such as pipes or tubes are joined together by butting the ends of the tubing together, inserting a support mandrel from an open end of the tubing under the joint, and then performing friction stir joining of the tubing. This concept has already been disclosed in patents and publications and is widely accepted as an effective means of joining curved surfaces together. The terms "tubular", "coiled tubing", "tube", "tubing", "drillpipe", "casing", and "pipe" and other like terms may be used interchangeably throughout this document. The terms may be used in combination with "joint", "segment", "section", "string" and other like terms referencing a length of tubular.

One of the problems that has arisen that is specific to the joining of pipes using friction stir joining involves the use of a mandrel to react the forces of the pin tool during friction stir joining. When working with pipelines, the length of a pipe section is approximately 40 feet and the diameter is such that a mandrel can easily be moved, expanded, retracted and moved again to follow the pipe laying process. However, this process is difficult for smaller diameter tubing or tubing that is longer than the pipe section described above.

The coiled tubing industry uses continuous coils of tubing that may be longer than 30,000 feet. This tubing may be uncoiled and fed into an oil well for pumping and extracting fluids and then recoiled after pumping. If the tubing is broken at mid-section, for example, there may be no way to insert, expand, contract and retrieve a mandrel in order to use the friction stir joining process to repair the tubing.

In the case of coiled tubing, conventional welding decreases the strength of the tubing. This decrease in tube strength is primarily due to the cast microstructure and accompanying defects that result from the welding process. Friction stir joining may provide a stronger joint because of the wrought microstructure that is formed. There is presently no means, however, to use conventional mandrels of current designs to react the forces encountered during friction stir joining.

BRIEF SUMMARY

The present invention is a system and method for providing a mandrel that can be used to react the loads that are created by a friction stir joining tool as it performs friction stir joining of tubulars, the mandrel comprised of a disposable mandrel, a partially disposable mandrel, a reusable mandrel, and a mandrel that is partially disposable and partially reusable, the mandrel that is partially disposable and partially reusable including a supporting mandrel portion that supports a hard mandrel portion comprising a plurality of hard mandrel segments that support the tubing during friction stir joining, and using a fluid to dissolve the supporting mandrel portion and allowing the hard mandrel segments to separate and flow out of the tubing after friction stir joining.

These and other embodiments of the present invention will become apparent to those skilled in the art from a consideration of the following detailed description taken in combination with the accompanying drawings.

DETAILED DESCRIPTION

Reference will now be made to the drawings in which the various embodiments of the present invention will be given numerical designations and in which the embodiments will be discussed so as to enable one skilled in the art to make and use the invention. It is to be understood that the following description illustrates embodiments of the present invention, and should not be viewed as narrowing the claims which follow.

This first embodiment describes a disposable mandrel that may be used to react the loads that are created by a friction stir joining tool against coiled tubing. In this and other embodiments, the mandrel may be completely disposable, partially disposable and partially reusable, or completely reusable. If there is a portion of the mandrel which is disposable, that portion may dissolve or fracture into pieces. If there is a portion of the mandrel which is reusable, that portion may be a smaller component of a mandrel that may disassemble so as to be flushable from the coiled tubing and be reusable.

The coiled tubing may need to be prepared for the friction stir joining process. For example, a section of coiled tubing may be non-compliant and may require repairing because of a crack or other damage that is allowing the coiled tubing to leak a fluid that is passing through. The damaged section of tubing may be removed, resulting in two tube ends that may be joined using friction stir joining and a mandrel of the present invention. The tube ends may be prepared using techniques that are known to those skilled in the art or are as described in the co-pending application titled FRICTION STIR JOINING OF CURVED SURFACES and filed on May 14, 2012, and having Ser. No. 61/646,880. The tube ends may be prepared for a fit and alignment that is suitable for friction stir joining.

A removable or disposable mandrel may be used when performing friction stir joining on tubing because it may be difficult to reach in and push through or pull out a state of the art mandrel because of the large distances that a repair might be performed from the ends of the coiled tubing. Accordingly, one or more embodiments of the present invention may describe the use of a reusable and disposable mandrel, a reusable mandrel, or a disposable mandrel, that may be inserted far from the end of some coiled tubing and then removed. Removal of the mandrel enables continued use of the coiled tubing.

Figure 5:
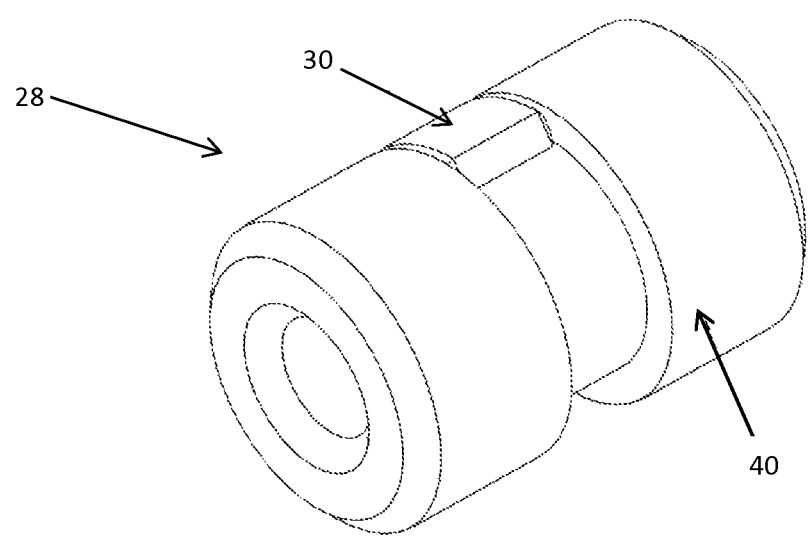
FIG. 5 is a perspective view of a combination of the supporting mandrel portion of the disposable mandrel and the first segment of the plurality of hard mandrel segments.

A first embodiment describes a first mandrel having a partially reusable portion and a partially disposable portion of a reusable and disposable mandrel 28 (see FIG. 5). The reusable and disposable mandrel 28 has at least two elements, a hard outer reusable mandrel (hereinafter "hard mandrel portion") and a removable supporting interior disposable mandrel (hereinafter "supporting mandrel portion").

Figure 1:
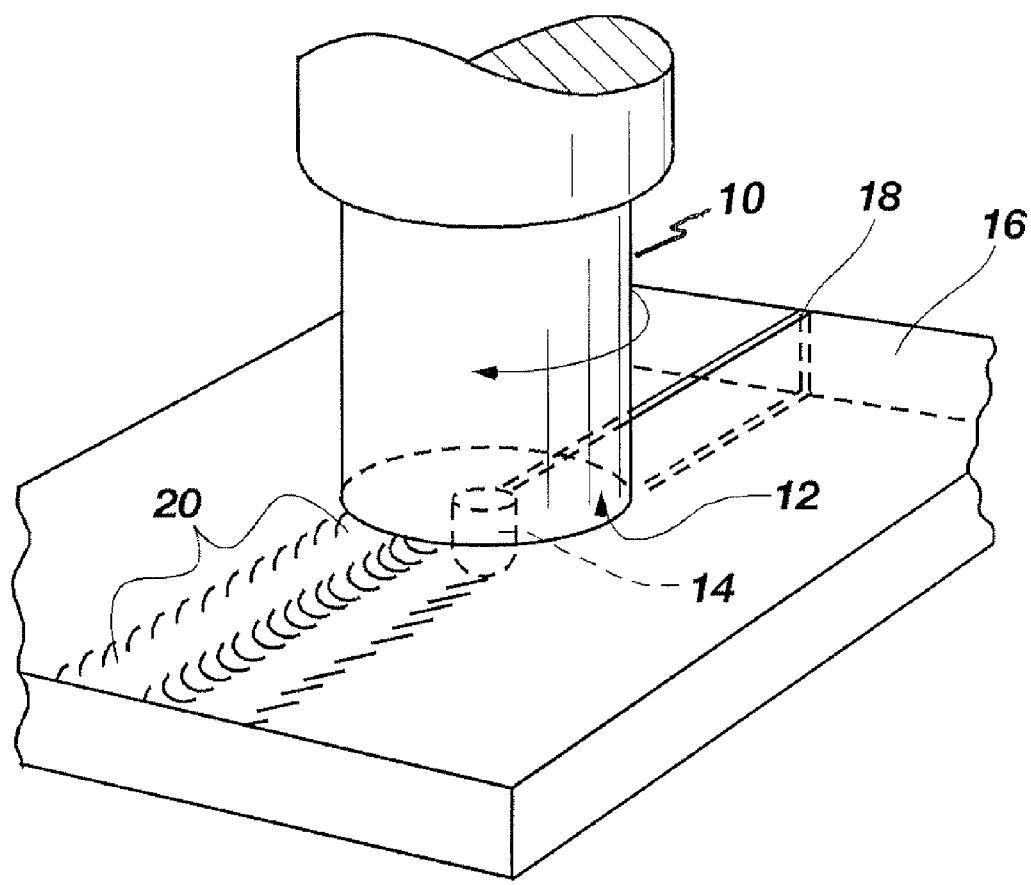
FIG. 1 is a perspective illustration of the prior art showing friction stir welding of workpieces.
Figure 2A:
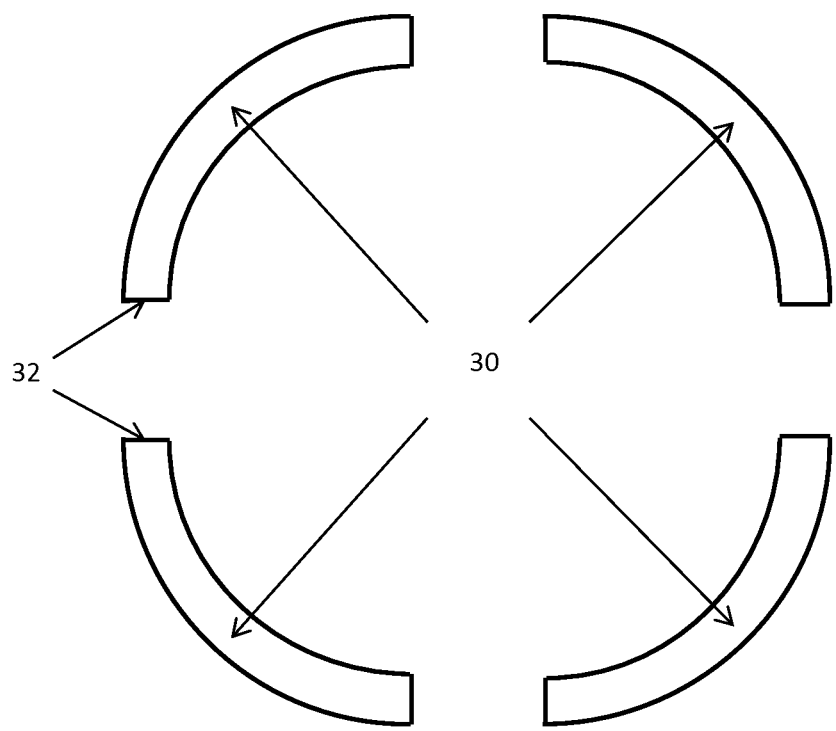
FIG. 2A is a profile view of a plurality of hard mandrel segments that are separate from each other but form the outline of a circular shape.

FIG. 2A is a first example of the reusable portion of the reusable and disposable mandrel 28. The hard mandrel portion may be formed from a plurality of separate hard mandrel segments 30, wherein "hard" is defined as capable of reacting the loads and withstanding the heat of friction stir joining. The plurality of hard mandrel segments 30 form the portion of the reusable and disposable mandrel 28 that provides a reactive force directly under the friction stir joining tool at a joint between two ends of tubing that is being joined by friction stir joining.

FIG. 2A is a profile view of the plurality of hard mandrel segments 30 that are separate from each other but which form the outline of a circular shape that matches the inside diameter (ID) of the coiled tubing.

The circular shape should not be considered limiting and is for illustration purposes only. The plurality of hard mandrel segments 30 may be designed so as to conform to the shape of any tubing that is going to be joined or repaired. Furthermore, the number of hard mandrel segments 30 is not limited to the number shown. There may be as few as one hard mandrel segment 30 and no upper limit on the total number of segments that may be used to form a hard mandrel portion of the reusable and disposable mandrel 28. For example two, three, four, five, six, or more hard mandrel segments 30 may be combined to form a single hard mandrel portion of the reusable and disposable mandrel 28. The hard mandrel segments 30 may have the longest cord dimension that still allows them to move freely down the tubing.

In the first embodiment, the hard mandrel segments may have a thermal expansion rate that is equal to or greater than the thermal expansion rate of the tubing.

While it is likely that the hard mandrel segments 30 may travel down the tubing without breaking, it is another aspect of this embodiment that the hard mandrel segments may be breakable in order to remove them from the tubing, or to facilitate travel down the tubing. The hard mandrel segments 30 may be broken by any means that does not damage the tubing, including the use of ultrasonic waves, sonic waves, direct impact and indirect impact.

Figure 2B:
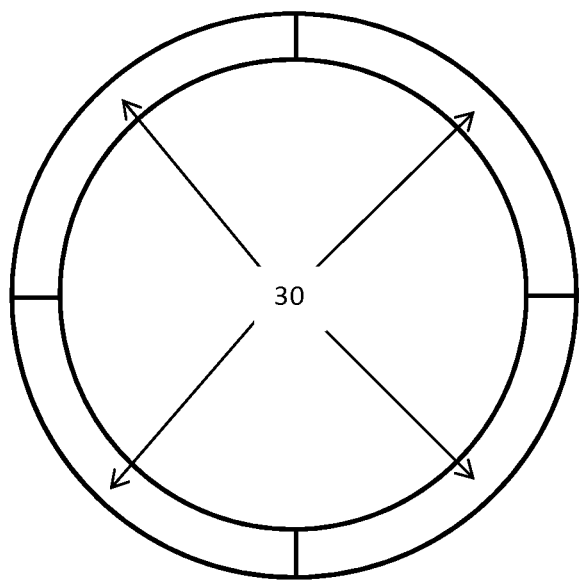
FIG. 2B is the profile view of the plurality of hard mandrel segments from FIG. 2A which are brought together to form a circular hard mandrel portion of the reusable and disposable mandrel.

FIG. 2B is a profile view of the plurality of hard mandrel segments 30 brought together to form the hard mandrel portion of the reusable and disposable mandrel 28. The plurality of hard mandrel segments 30 are capable of providing the reactive force to the friction stir joining tool, and capable of withstanding the heat that is generated while the tubing is being joined using friction stir joining.

Once the tubing is joined, the plurality of hard mandrel segments 30 require removal. A flow of liquid past the plurality of hard mandrel segments 30 may be sufficient to break apart the assembled shape that they may form in FIG. 2B during friction stir joining. Thus, in this first embodiment, the plurality of hard mandrel segments 30 are not attached to each other but are in contact with each other. Therefore, it is a feature of the first embodiment that the touching surfaces 32 (see FIG. 2A) between the plurality of hard mandrel segments 30 may be made at such angles so that when a liquid flows past the plurality of hard mandrel segments after the supporting mandrel portion is weakened or gone, they may flow through the tubing without hindrance.

Therefore, the angle shown for the touching surfaces 32 is for illustration purposes only and should not be considered as limiting. The angle of the touching surfaces 32 may be changed as needed in order to comply with the requirement that the hard mandrel segments 30 be able to come apart if a liquid flows past them in the tubing.

Figure 3:
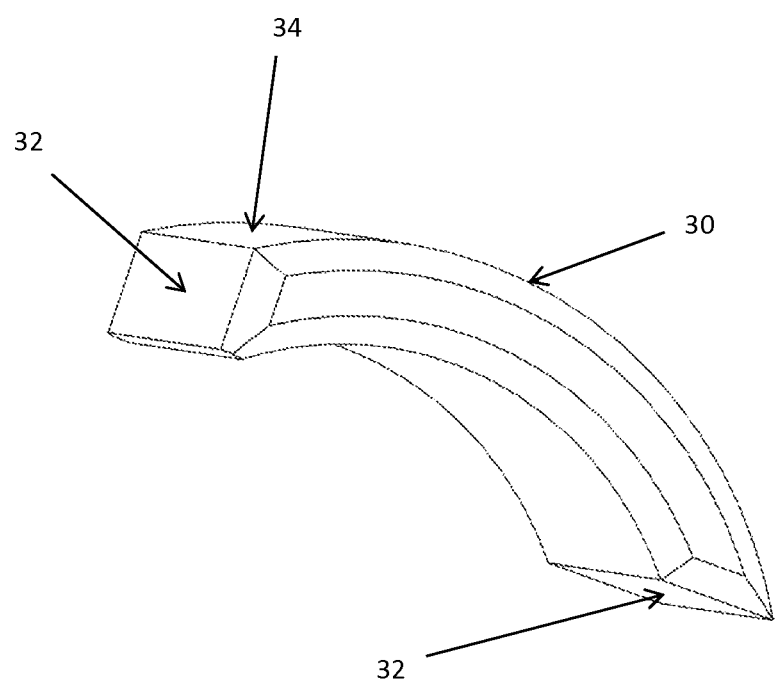
FIG. 3 is a close-up and perspective view of a first embodiment of a single segment of the plurality of hard mandrel segments.

FIG. 3 is a close-up and perspective view of a single segment 30 of the plurality of hard mandrel segments. This shape of the single segment 30 should not be considered limiting but is for illustration purposes only. In order to provide the desired reactive force, the outer curved surface 34 of each of the plurality of hard mandrel segments 30 may be made so as to be concentric and coincident with the inside diameter of the tubing.

Figure 4:
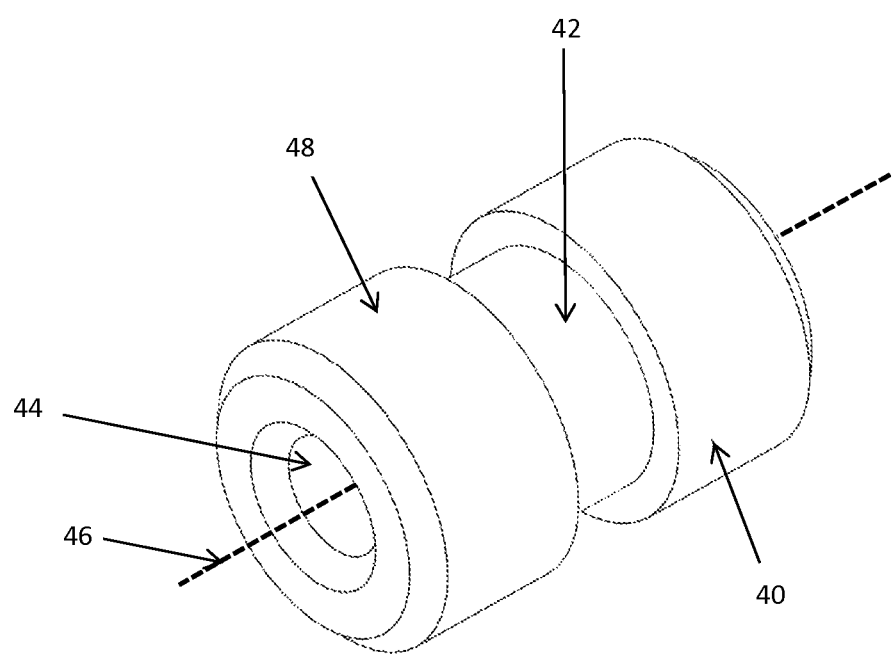
FIG. 4 is a perspective view of a first embodiment of the supporting mandrel portion of the reusable and disposable mandrel.

FIG. 4 shows that the reusable and disposable mandrel 28 also includes the supporting mandrel portion 40 which is the disposable part of the mandrel. The supporting mandrel portion 40 may be used as a support or framework for the hard mandrel portion while friction stir joining is being performed. Once friction stir joining is performed on the tubing, the reusable and disposable mandrel 28 may be removed so that the tubing may perform its function of allowing fluids to flow through it without obstruction from the reusable and disposable mandrel 28.

The reusable and disposable mandrel 28 having a hard mandrel portion provides the reactive force and heat tolerance to perform friction stir joining of the tubing. In this first embodiment, the supporting mandrel portion 40 may be dissolvable, thereby allowing the plurality of hard mandrel segments 30 to be removed by the flow of a liquid through the tubing. For example, water may be used as the liquid for dissolving the supporting mandrel portion 40.

FIG. 4 is a perspective view of the first embodiment of the supporting mandrel portion 40 of the reusable and disposable mandrel 28. There are several features of the supporting mandrel portion 40 that will be identified as relevant to the function of the reusable and disposable mandrel 28.

A first feature is that the supporting mandrel portion 40 includes at least one channel 42 or groove that enables placement of the plurality of hard mandrel segments 30 in a position for friction stir joining. By creating the channel 42, the plurality of hard mandrel segments 30 will not come apart prematurely before friction stir joining is complete. The precise location of the channel 42 is not limited by the channel shown in FIG. 4.

For example, the supporting mandrel portion 40 is shown as having the channel 42 that is centered between the ends of the reusable and disposable mandrel 28. However, the channel 42 may be disposed nearer to an end of the reusable and disposable mandrel 28 or on an end thereof. The plurality of hard mandrel segments 30 may be supported during friction stir joining by the supporting mandrel portion 40 anywhere along its length. The example of centering the channel 42 along the length of the supporting mandrel portion 40 should not be considering limiting.

A second feature of the supporting mandrel portion 40 is that the shape may be substantially cylindrical so that it may easily fit within cylindrical tubing being joined and/or repaired. However, it should be understood that the shape of the supporting mandrel portion 40 may be changed to match the ID of the tubing. Thus, the supporting mandrel portion 40 may have a cross-sectional shape other than a circle without departing from the scope of the first embodiment. The cross-sectional shape may be made to match the interior cross-section of any tubing.

The channel 42 is generally going to be made to a depth such that after the plurality of hard mandrel segments 30 are inserted, the outer curved surface 48 of the supporting mandrel portion 40 and the outer curved surface 34 of the plurality of hard mandrel segments may be flush. This configuration may further prevent the reusable and disposable mandrel 28 from sliding inside the tubing during friction stir joining. However, it should also be understood that at least the plurality of hard mandrel segments 30 will be flush against the ID of the tubing.

In an alternative embodiment, the hard mandrel segments 30 may include small projections on an underside that may fit in a corresponding indentation in the supporting mandrel portion 40 to further anchor the hard mandrel segments until they are ready to flow down the tubing.

A third feature of the supporting mandrel portion 40 is an aperture 44 through the center and along an axis 46 that is parallel to the tubing. The aperture 44 enables a liquid to flow completely through the supporting mandrel portion 40. The flow of liquid may be used to dissolve whatever portion of the supporting mandrel portion 40 is dissolvable, such that it no longer continues to hold the plurality of hard mandrel segments 30 in place or in the assembled shape. Even if the flow of liquid does not completely dissolve the supporting mandrel portion 40, enough may be dissolved to enable the plurality of hard mandrel segments 30 to not keep their assembled shape and to instead flow down the tubing as separated hard mandrel segments.

FIG. 5 is a perspective view of the reusable and disposable mandrel 28 as a combination of the supporting mandrel portion 40 and a first segment 30 of the plurality of hard mandrel segments after it is disposed in the channel 42.

While the embodiment above describes a hard mandrel portion formed of a plurality of hard mandrel segments 30, in an alternative embodiment the plurality of hard mandrel segments do not form a continuous ring around the reusable and disposable mandrel 28.

Figure 6:
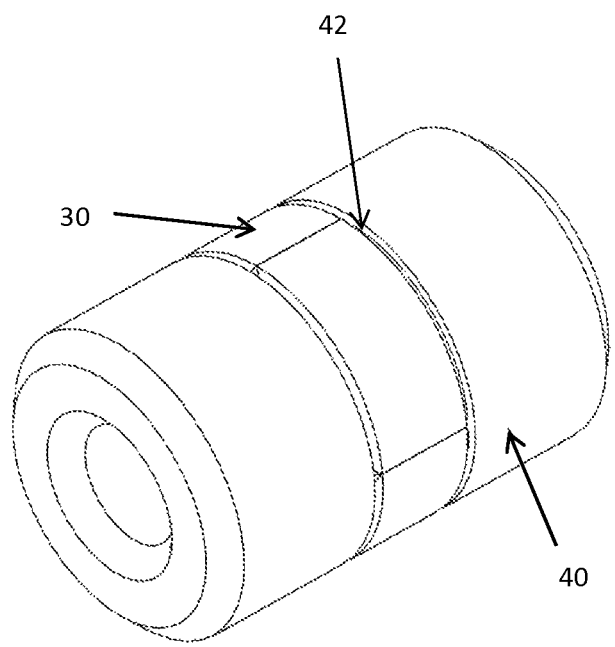
FIG. 6 is a perspective view of the plurality of hard mandrel segments forming a continuous outer ring.

FIG. 6 is a perspective view of the reusable and disposable mandrel 28 with a complete ring of hard mandrel segments 30 in the channel 42 of the supporting mandrel portion 40. The plurality of hard mandrel segments 30 may be held in place while the reusable and disposable mandrel 28 is being put into position in the tubing by one of several methods. For example, an adhesive may be placed between the supporting mandrel portion 40 and the plurality of hard mandrel segments 30, but not between the plurality of hard mandrel segments. In another embodiment, the plurality of hard mandrel segments 30 may use an interference fit in the channel 42, or use a combination of the adhesive and the interference fit. These examples should not be considered as limiting the methods that may be used to hold the plurality of hard mandrel segments 30 in place.

Figure 7:
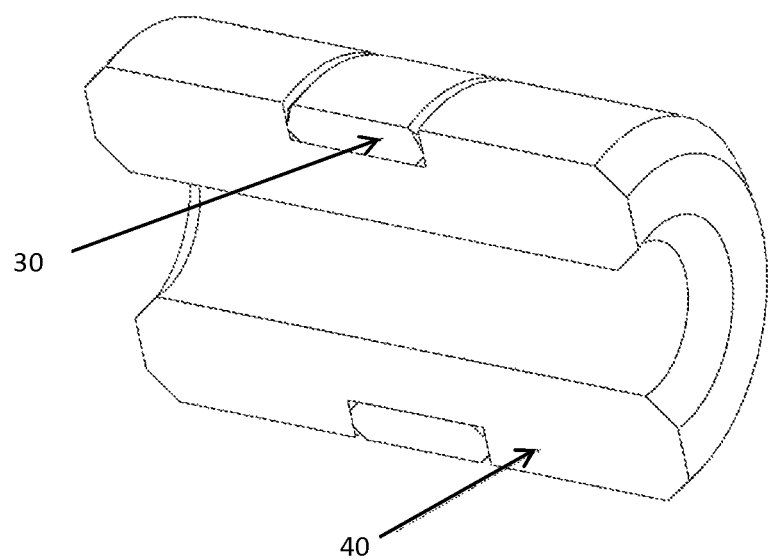
FIG. 7 is a cut-away perspective view of the completed disposable mandrel formed as a combination of the supporting mandrel portion and the plurality of hard mandrel segments that form the hard mandrel portion.

FIG. 7 is a cut-away perspective view of the completed reusable and disposable mandrel 28 of FIG. 6, including the plurality of hard mandrel segments 30 and the supporting mandrel portion 40.

Figure 8:
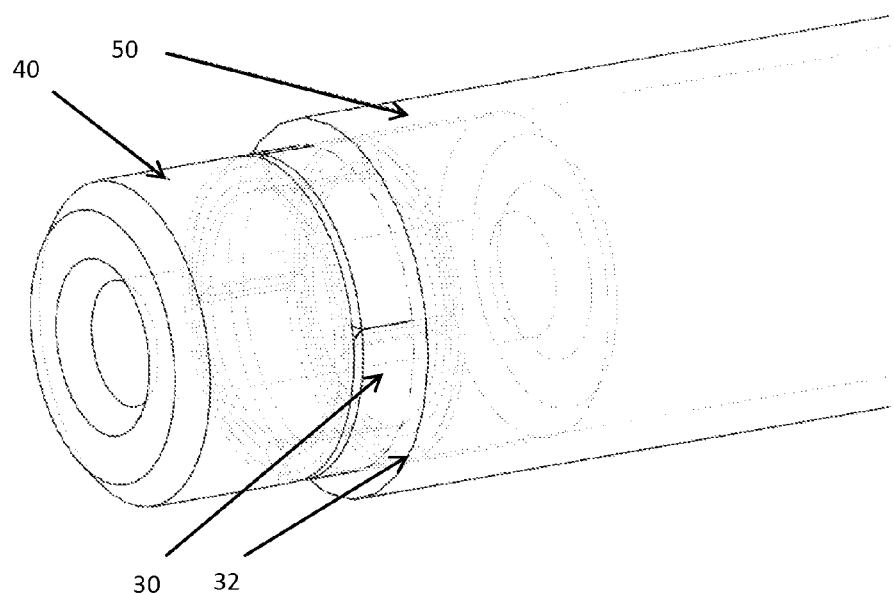
FIG. 8 is a perspective view showing the disposable mandrel inserted into the end of a first tube.

FIG. 8 is a perspective view of one end of a first tube 50 and a portion of the reusable and disposable mandrel 28. This figure shows that once the reusable and disposable mandrel 28 is completely assembled with the plurality of hard mandrel segments 30 disposed in the supporting mandrel portion 40, the reusable and disposable mandrel is inserted into the first tube 50 so that approximately half of the plurality of hard mandrel segments 30 are covered by the end of the first tube 50.

The end of the first tube 50 should cover a portion of the plurality of hard segments 30 whether the joint 32 is on a bias or is going to be a butt weld. The plurality of hard segments 30 should not slide so that they remain under the joint 32 formed by the first tube 50 and a second tube (not shown).

Figure 9:
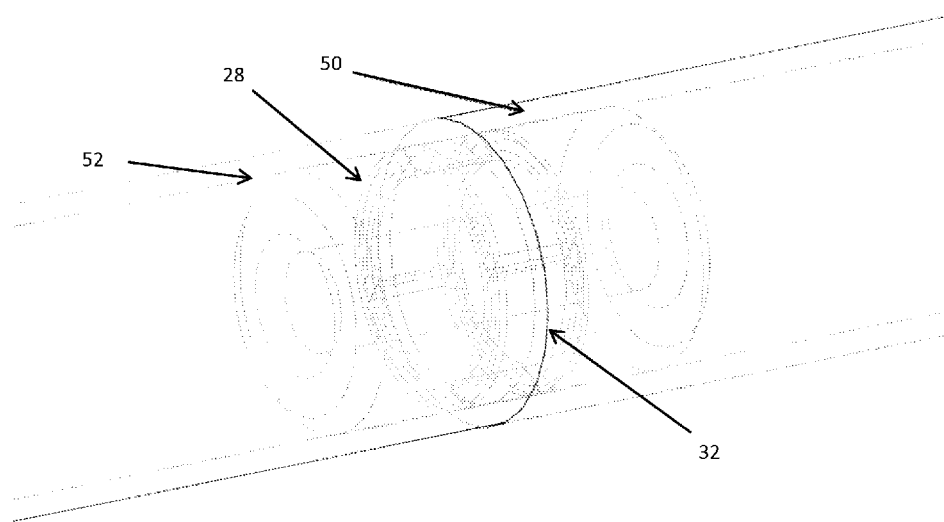
FIG. 9 is a perspective view of the tubing with the ends flush, and the joint between them is positioned over the hard mandrel portion of the reusable and disposable mandrel.

FIG. 9 is a perspective view of one end of the first tube 50, one end of a second tube 52 and a portion of the reusable and disposable mandrel 28. After the reusable and disposable mandrel 36 is inserted into the first tube 50 so that approximately half of the plurality of hard mandrel segments 30 are covered by the end of the first tube 50, the second tube 52 is slid onto the other half of the plurality of hard mandrel segments 30, thereby completely covering the reusable and disposable mandrel 36. The first tube 50 and the second tube 52 are now ready to be joined using friction stir joining. It should be understood that the first tube 50 and the second tube 52 should be flush, and the joint 32 between them should be positioned over the hard mandrel portion 30 of the reusable and disposable mandrel 28.

Once friction stir joining of the tubing is complete, the reusable part of the reusable and disposable mandrel 28 may be removed. A liquid may be flushed through the tubing so that it passes through the aperture 44 in the supporting mandrel portion 40. In a first embodiment, the liquid may be a material that is corrosive to the supporting mandrel portion 40 that will at least partially dissolve, if not completely, the supporting mandrel portion. For example, if the supporting mandrel portion 40 is comprised of aluminum, then hydrochloric acid or potassium hydroxide may be used as the dissolving liquid. Before the supporting mandrel portion 40 is completely gone, the plurality of hard mandrel segments 30 may fall off the supporting mandrel portion and begin to flow with the liquid through the tubing.

The material used for the supporting mandrel portion 40 is not limited to aluminum. Aluminum is used for illustration purposes only. The supporting mandrel portion may be manufactured of any suitable material that will provide sufficient support for the plurality of hard mandrel segments 30 during friction stir joining, but also be capable of being dissolved sufficiently to allow the plurality of hard mandrel segments to come apart and flow through the tubing after friction stir joining.

The plurality of hard mandrel segments 30 may be metallic or non-metallic (i.e. carbide, ceramic, hardened alloy steel, etc.). The plurality of hard mandrel segments 30 may also be coated with a material that functions as a diffusion barrier to prevent the plurality of hard mandrel segments 30 from attaching to the interior of the tubing during friction stir joining.

Regardless of whether the supporting mandrel portion 40 is metallic or non-metallic, it may be dissolved or fractured by a single method or by a combination of methods that include but are not limited to being: dissolved by an acid or a base; dissolved by water or other liquid, by a vapor, a particulate or any combination thereof; melted and then dissolved; frozen and then fractured; fractured without being frozen; fractured by ultrasonic waves; sonic waves or ultralow frequency waves including random and variable frequencies; fractured using magnetic methods, harmonics, resonance, and direct or indirect impact; fractured by coiling of the tubing; and fractured by deformation.

Other materials that may be used for a supporting mandrel portion 40 that may be dissolved include, but should not be considered as limited to, a dissolvable aluminum, a salt that may be compacted into a tube structure, sand with a dissolvable adhesive, a dissolvable adhesive such as honey, or combinations of these materials.

Internal impacts may be caused by a projectile inserted into and sent through the tubing that may fracture or remove one or more of the plurality of hard mandrel segments 30, or even shatter the plurality of hard mandrel segments and/or the supporting mandrel portion 40. The entire reusable and disposable mandrel 28 or any portion thereof might also be moved or flushed in the tubing by a fluid such as a gas or a liquid, by a solid, or by any combination thereof. The projectile may be metallic, non-metallic and any convenient shape. For example, a ball-bearing may be used as the projectile.

One aspect of preparing tubing for friction stir joining has to do with the path of the joint. For example, coiled tubing may be disposed into long and continuous coils for downhole use in wells. Different segments of coiled tubing are often joined together by coupling the segments using a bias weld in order to decrease stress on the joints between segments.

Figure 10:
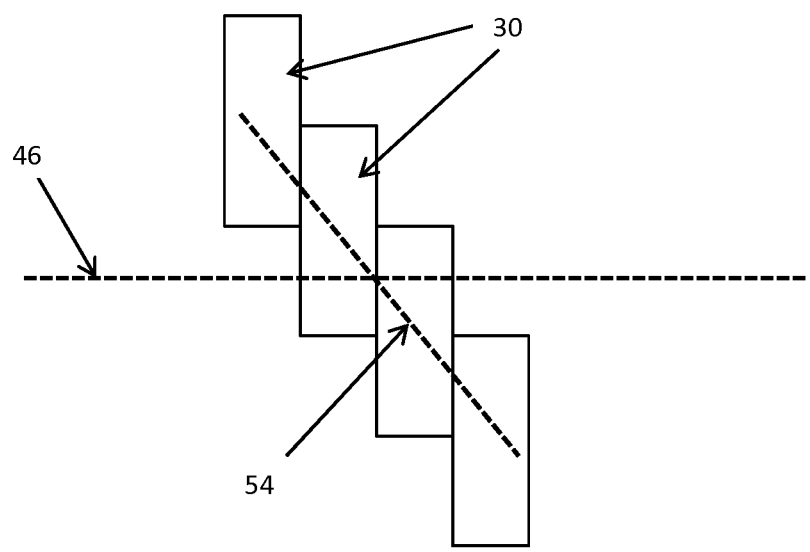
FIG. 10 is a top view showing the hard mandrel segments that are offset from each other in order to provide support under a bias joint.

Thus, it should be understood that the plurality of hard mandrel segments 30 of the disposable mandrel may not be aligned to make a circular shape. Instead, the plurality of hard mandrel segments 30 may be offset from each other as shown in FIG. 10. FIG. 10 shows the plurality of hard mandrel segments 30 if they were to be flattened and laid next to each other as they would be arranged on a supporting mandrel portion 40. The bias joint that the plurality of hard mandrel segments 30 would be supporting is shown as the dotted line 54. The dotted line 46 indicates the long axis of the tube in which the reusable and disposable mandrel 28 would be disposed.

FIGS. 2A through 10 describe a reusable and disposable mandrel 28. However, the combination of both a partially reusable portion and a partially disposable portion of a reusable and disposable mandrel 28 are not required in order to provide a mandrel that may be disposed of even when it is unreachable from an end of a long tube.

In an alternative embodiment, the entire mandrel may be made of a dissolvable material. By giving the dissolvable mandrel sufficient structural strength, it may be possible that the dissolvable mandrel may last long enough to perform the friction stir joining before failing. Materials that may be used for the dissolvable mandrel are listed above.

Figure 11:
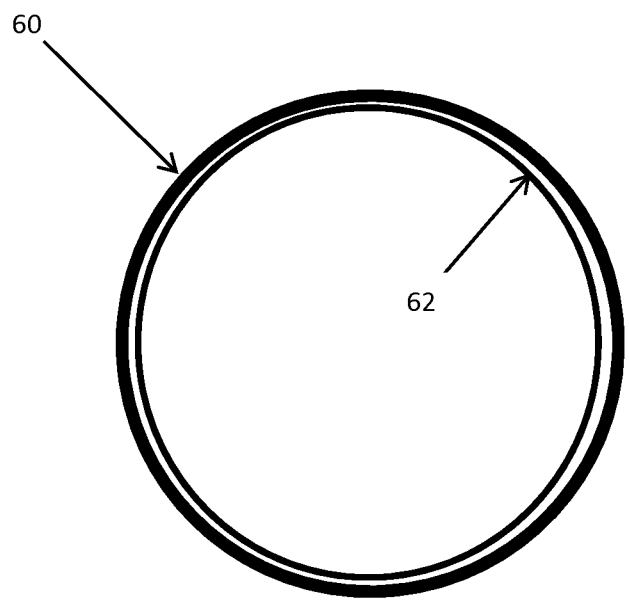
FIG. 11 is a profile view showing the tubing and an inner sleeve disposed within the tubing that may be made part of the tubing during friction stir joining.

FIG. 11 shows in an alternative embodiment, in a view into the end of a tube 60, an internal sleeve 62 has been inserted. The internal sleeve 62 may be pressed against the ID of the tube 60 in the location that a mandrel would be inserted. The internal sleeve 62 is then friction stir welded into place inside the tube 60 as the tube undergoes friction stir joining. The internal sleeve 62 is then left inside the tube 60 instead of being removed after the joining or repairing of the tube. Such an internal sleeve 62 may be constructed of a metal or a non-metallic material. In other embodiments, the internal sleeve 62 may be dissolved as described previously, or it may be removed by electrolysis or reverse plating. It is noted that any space between the tube 60 and the internal sleeve 62 is exaggerated for illustration purposes only. There may be no space between tube 60 and the internal sleeve 62 in actual use.

However, in another alternative embodiment, all of the structural elements of a reusable mandrel 70 may be recoverable for use again. While some embodiments above are focused on the use of a mandrel that is dissolvable, partially dissolvable or even breakable, in a different embodiment, a mandrel that is not dissolvable or breakable may also be used.

Figure 12:
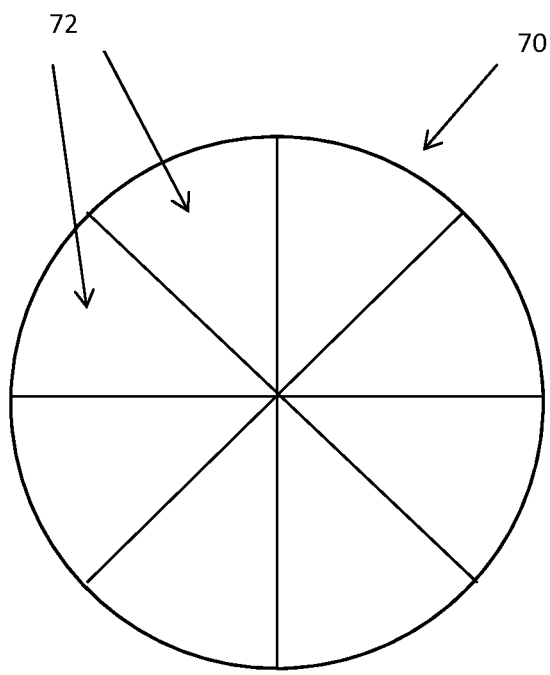
FIG. 12 is a profile view showing hard mandrel segments formed as wedge-shaped segments that form a complete circle, and are placed inside the tubing at the joint that is to undergo friction stir joining, and then knocked out of place using one of the methods previously described.

FIG. 12 shows a profile view of another embodiment in which a disposable mandrel may be replaced with a reusable mandrel 70 that is constructed entirely of a plurality of hard mandrel segments 72 that may temporarily support each other. The plurality of hard mandrel segments 72 are each formed as wedge-shaped segments that form a complete circle, which are then placed inside tubing at a joint that is to undergo friction stir joining. After friction stir joining is performed on the tubing, the wedge-shaped hard mandrel segments 72 are knocked out of place using one of the methods previously described, such as by a projectile inserted into the tubing. The projectile flows through the tubing until it impacts the plurality of hard mandrel segments 72. While the example in FIG. 12 shows a total of eight wedge-shaped hard mandrel segments 72, the number of segments used to form the completely reusable mandrel 70 may vary and should not be considered to be a limitation of this embodiment.

Figure 13:
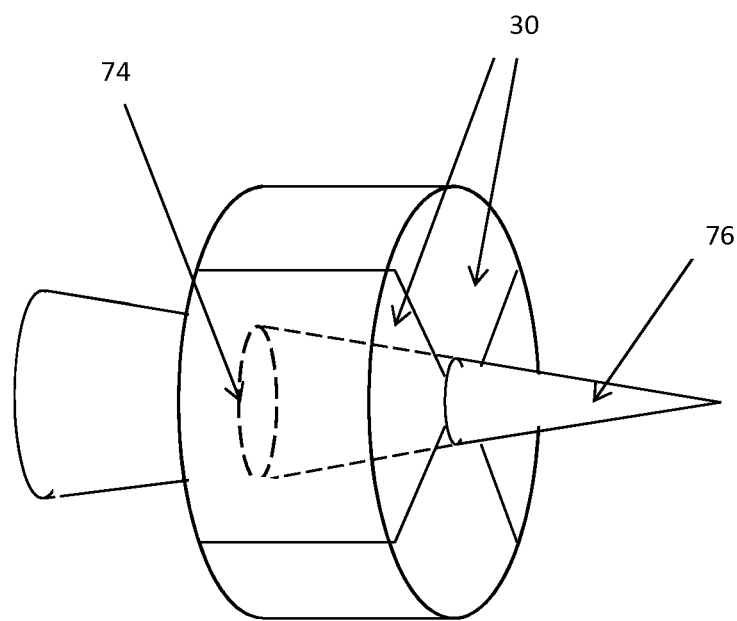
FIG. 13 is a perspective view of a completely reusable mandrel comprised of wedge-shaped hard mandrel segments that when brought together include a conical aperture that is fitted with a plug during friction stir joining, and then the plug is removed by a projectile.

FIG. 13 is a perspective view showing a plurality of hard mandrel segments 30 formed as wedge-shaped mandrel segments. When the wedge-shaped mandrel segments 30 are in place, a conical hole 74 is formed through the center of the wedge-shaped mandrel segments 30. A conical plug 76 is inserted into the hole 74. The wedge-shaped mandrel segments 30 are only held in place as long as the plug 76 is in place. However, once friction stir joining is complete, a projectile is sent through the tubing. When the projectile makes impact with the plug 76, the plug is dislodged from the hole 74. Once the plug is removed, the wedge-shaped mandrel segments 30 are designed to fall apart and flow down the tubing with the plug 76 and the projectile.

It should be understood that the number of wedge-shaped hard mandrel segments 30 may vary in order to make them small enough to travel down the tubing after being hit and dislodged by the projectile. The conical plug 76 may also be modified in its shape and dimensions. FIG. 13 is for illustration purposes of the principles only, and should not be considered to be a limiting rendering.

Figure 14:
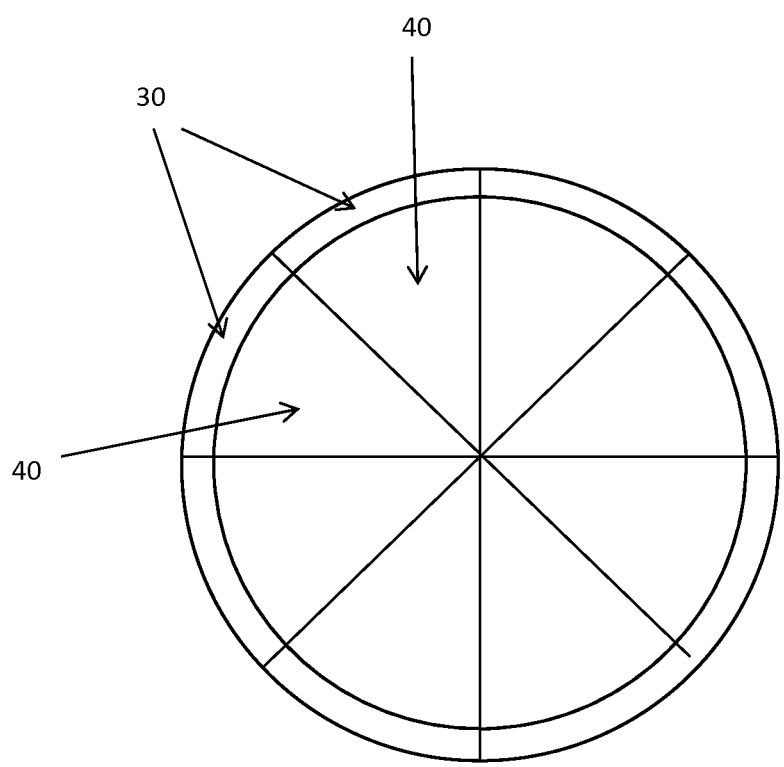
FIG. 14 is a profile view showing wedge-shaped support mandrel segments that form a complete circle, and an outer arrangement of hard mandrel segments, all the segments being knocked out of place after friction stir joining.

FIG. 14 is a profile view of another embodiment of the present invention. While some embodiments describe a dissolvable supporting mandrel portion 40, another embodiment is the use of a combination of a supporting mandrel portion 40 and a hard mandrel portion 30 of a mandrel where the supporting mandrel portion is not dissolved. This embodiment may also be reusable. In this embodiment, the wedge-shaped hard mandrel pieces 30 may be formed from a material used for the supporting mandrel portion 40, and an outer material formed from the material used for the hard mandrel portion. These wedge-shaped hard mandrel pieces 30 may be held together with an adhesive. After friction stir joining, the wedge-shape hard mandrel pieces 30 are dislodged by impact and may float down the tubing with the supporting mandrel portion.

Figure 15:
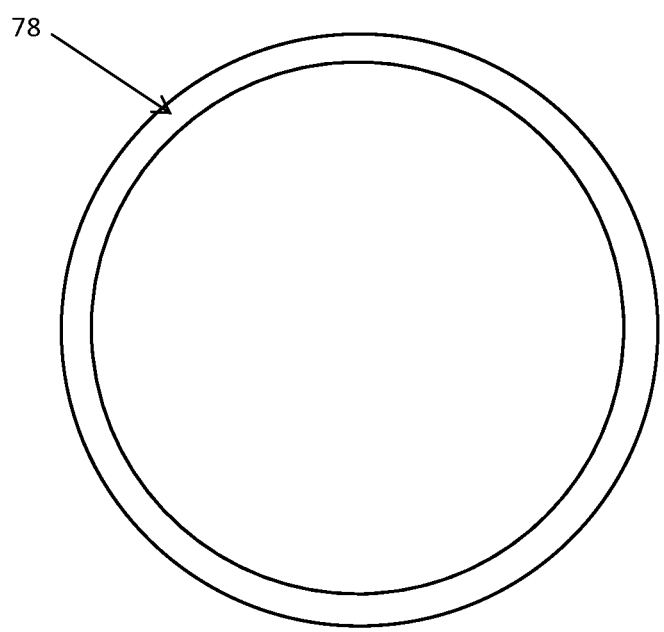
FIG. 15 is a profile view of a single hard mandrel ring that is either left in place after friction stir joining, or flushed down the tubing using a projectile to break the ring.

FIG. 15 is a profile view of another embodiment of the present invention. In this embodiment, the hard mandrel segments are replaced with a single hard mandrel ring 78 with no supporting mandrel portion. The hard mandrel ring 78 is inserted into the tubing under the joint that is being welded using friction stir joining. However, unlike being welded into place like the internal sleeve, the hard mandrel ring 78 is washed down the tubing after being broken into fragments using one of the methods described above, or it may be left in place.

Another embodiment may be the use of a liquid for cooling of the disposable or non-disposable mandrel during friction stir joining. The cooling may enable the fracturing of the disposable or non-disposable mandrel in order to remove them after friction stir joining. In another embodiment, both the hard mandrel segments and the supporting mandrel portion may be positioned together using adhesive that is sublimated by temperature and parts are removed by flushing as described above.

In another embodiment, it may also be possible to attach a wire to a non-disposable mandrel. The wire may then be used to retrieve the non-disposable mandrel after friction stir joining of the tubing.

In another embodiment, it may also be possible to provide a non-disposable mandrel that may be operated by remote control in order to remove it from the tubing. For example, the non-disposable mandrel may include a motorized drive mechanism that enables the non-disposable mandrel to push or pull itself through the tubing. Operation of the motorized drive mechanism and any other controllable elements of the non-disposable mandrel may be controlled by an operator. Other controllable elements may include a system for expanding and retracting the hard mandrel portion in order to engage the ID of the tubing in order to perform friction stir joining.

Similarly, the non-disposable mandrel may be able to autonomously control its own movement using a motorized drive mechanism that enables the non-disposable mandrel to push or pull itself through the tubing and exit the tubing after friction stir joining. The autonomous control may also include a system for expanding and retracting the hard mandrel portion in order to engage the ID of the tubing.

At least a portion of the disposable and non-disposable mandrels may be resized. Resizing may be possible, for example, using cold swaging, thereby adjusting roundness, ovality and distortions.

At least some of the embodiments have been directed to the aspect of joining or repairing the tubing. However, the removable mandrel may also be used to perform another variation of friction stir joining, including but not limited to friction stir processing (FSP), friction stir mixing (FSM), and friction stir spot welding (FSSW). Thus if the tubing does not have a hole but has wear or other damage on the tubing that will likely result in failure at some time, the tubing may be friction stir processed to prevent tube failure without having to cut away all of the damaged tubing. The tubing is cut and a mandrel is inserted. Friction stir processing is performed on the tubing, and then friction stir joining is performed to re-join the tubing.

Those skilled in the art will readily appreciate that many modifications are possible in the example embodiments without materially departing from this invention. Accordingly, all such modifications are intended to be included within the scope of this disclosure as defined in the following claims. It is the express intention of the applicant not to invoke 35 U.S.C. §112, paragraph 6 for any limitations of any of the claims herein, except for those in which the claim expressly uses the words 'means for' together with an associated function.

What is claimed is:

1. A mandrel for use in friction stir joining, said mandrel comprised of:
    a hard mandrel portion that provides support for friction stir joining of a tubular, the hard mandrel portion forming an annular assembled shape formed by at least two hard mandrel segments inside the tubular and being positioned flush against an inner diameter of a tubular and configured to provide a reactive force opposing a load against the outer diameter of the tubular during friction stir joining of the tubular; and
    a supporting mandrel portion that is at least partially dissolvable, the supporting mandrel portion making contact with and providing support for the hard mandrel portion during friction stir joining, and wherein removal of the supporting mandrel portion causes the at least two hard mandrel segments to not remain in the annular assembled shape.

2. The mandrel as defined in claim 1 wherein the hard mandrel portion is coupled to the supporting mandrel portion by at least one attaching means selected from the group of attaching means including adhesive and an interference fit.

3. The mandrel as defined in claim 1 wherein the supporting mandrel portion includes a channel in which the hard mandrel portion is disposed.

4. The mandrel as defined in claim 1 wherein the at least two hard mandrel segments is comprised of a plurality of hard mandrel segments that fit end to end to form the hard mandrel portion.

5. The mandrel as defined in claim 1 wherein the hard mandrel portion is comprised of a material that can be fractured.

6. The mandrel as defined in claim 1 wherein the supporting mandrel portion has an aperture through a length thereof.

7. The mandrel as defined in claim 1 wherein the supporting mandrel is formed as a plurality of wedges, wherein the hard mandrel segments are disposed on an outer perimeter of the wedges, and wherein the wedges are coupled using an adhesive.

8. A mandrel for use in friction stir joining, said mandrel comprising:
    a plurality of hard mandrel segments that provide support for friction stir joining of a tubular, the plurality of hard mandrel segments forming an annular assembled shape inside the tubular and being positioned flush against an inner diameter of the tubular and configured to provide a reactive force opposing a load against the outer diameter of the tubular during friction stir joining of the tubular; and
    a supporting mandrel portion formed from a plurality of wedge-shaped segments, the supporting mandrel portion making contact with and providing support for the hard mandrel portion so that the hard mandrel portion is configured to provide the reactive force during friction stir joining, and wherein removal of the supporting mandrel portion causes the at least two hard mandrel segments to not remain in the annular assembled shape.

* * * * *